Dec. 3, 1929.  E. A. LAUGHLIN ET AL  1,737,594

SIDE BEARING

Original Filed Nov. 26, 1924

INVENTORS
Elmer A. Laughlin
Elon Pay Bacher
BY
ATTORNEY

Patented Dec. 3, 1929

1,737,594

UNITED STATES PATENT OFFICE

ELMYR A. LAUGHLIN, OF OREGON, ILLINOIS, AND EBEN RAY PACKER, OF NEW ROCHELLE, NEW YORK; SAID PACKER ASSIGNOR TO Q. & C. COMPANY, OF NEW YORK, N. Y., A CORPORATION OF MAINE

SIDE BEARING

Application filed November 26, 1924, Serial No. 752,297. Renewed January 25, 1928.

This invention relates to side bearings for railway cars and consists in improvements in the construction and arrangement thereof designed to produce a bearing structure offering substantial advantages over devices of the type as heretofore made.

Our improved side bearing is preferably of the type which may be termed of unlimited roller travel which is distinguished in its operation in that an anti-friction roller bearing provides for unlimited rolling travel by being so mounted as to be rotatable at all times. Important features of the present improvements comprise a separable bearing cradle or insert member to provide the bearing surfaces both for the roller periphery and the trunnion bearings thereof and thereby to permit of the bearing member being made of superior quality steel to that of the housing member so as to produce a more durable device with commercial economies. A further important feature of the present invention consists in the improved relative structure of the housing and separable bearing which allows of the device being mounted and operative either upon the truck or upon the body bolster and which formatively provides that the roller bearing is retained in its operating position by the cradle bearing member upon assembling of the parts and further in the improved arrangement whereby the cradle bearing member is retained in its position by the enclosing housing upon assembling of the device thereby further eliminating the necessity of special or additional securing means therefor.

The described and other valuable features and advantages of our present invention will be understood by reference to the accompanying parts in the several views.

Figure 1:
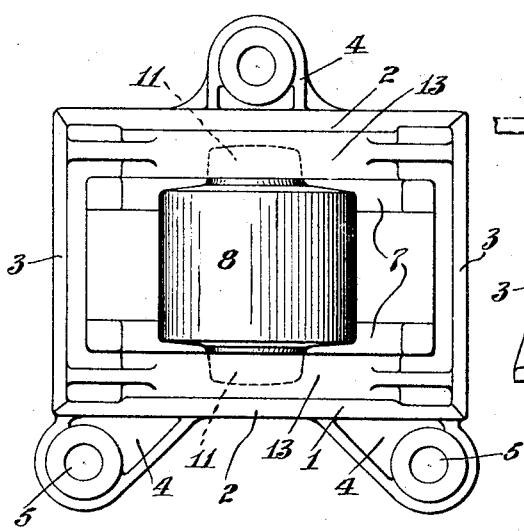
Fig. 1 is a plan view of a desirable bearing structure embodying the features of our invention.

In the desirable embodiment of the invention, as illustrated, 1 indicates a housing member which is an outer frame member for retaining the parts having side walls 2—2, end walls 3—3 and integral horizontal flange extensions 4, having apertures 5 to receive securing bolts or other retaining means for securing the bearing to the truck or body bolster as may be desired. Positioned within the housing there is provided a separable bearing or cradle member 6 formed with a centrally and longitudinally extending bearing surface 7 providing a bearing support for the periphery of a roller bearing or anti-friction member 8. The bearing cradle member is further formed at each side with longitudinally extending and integral guide shoulders 9 having their upper surfaces inclined upwardly from the central position and terminating in curved bearing surfaces 10 to be engaged by integral trunnion bearings 11, formed upon each side of the anti-friction roller 8, when the latter is at the end of its travel or longitudinal movement.

A wear plate 12 is secured upon the cooperating bolster member in position to engage the protruding peripheral surface of the antifriction roller whereby upon relative turning of the bolster member the roller bearing will be rotated in one direction or the other. Under normal conditions of slight relative movement it is designed that the weight of the car body shall be sustained upon the periphery of the roller bearing and that the roller shall have a limited traveling or rolling movement upon the bearing surface 7, but in the event of extreme or further relative movement of the bolsters, it is arranged that the trunnion bearings will engage the elevated end surfaces of the guide walls 9, thereby elevating the roller and transferring the load from the periphery thereof to the trunnions and as the roller reaches the extreme limit of its travel, the trunnion will engage the end bearing surfaces 10 and rotate in contact therewith to allow of additional movement of relative rotation of the bolster members while providing a rotating bearing therefor.

The construction, accordingly, provides an anti-friction bearing, the roller of which is at all times rotatable whereby unlimited rolling travel of the relatively moving bolsters is allowed.

The lower bearing surface 7, as illustrated is formed to incline upwardly toward each end from a central point to produce the condition whereby the roller bearing will normally tend to ride down the incline to central position, as shown in full lines in the drawing. The incline surfaces of the guide shoulders 9, as will be noted, will similarly function to return the roller to the central position. The inclined bearing and runway for the roller thus formed, functions upon swiveling of the truck slightly to elevate the car body and the weight of the latter will, accordingly, tend to straighten out the truck, thereby introducing a desirable self-guiding action.

Figure 4:
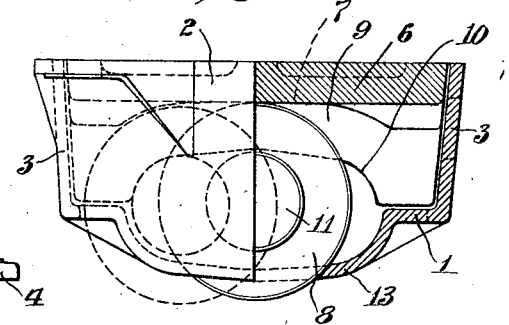
Fig. 4 is a view corresponding to Fig. 2, showing the parts inverted in position as when mounted upon the body bolster.
Figure 5:
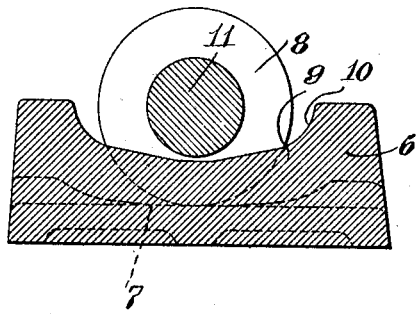
Fig. 5 is a vertical longitudinal sectional view taken on line $x$—$x$ of Fig. 3, showing the bearing engagement between the roller bearing and the cradle member when in central position
Figure 6:
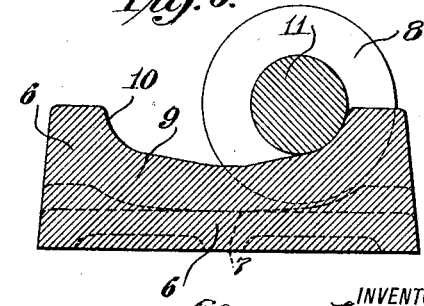
Fig. 6 is a similar view illustrating the bearing engagement between said parts when the roller bearing has reached the limit of its travel.

In accordance with an important feature of the present invention, the respective bearings for the roller periphery and for the trunnions, are formed upon a single and integral bearing member in the form of a cradle insert, separable from the housing and designed to be fitted therein. The separable bearing member, thus provided, affords the important commercial advantage of allowing the bearing member to be made of a higher quality steel than that of the housing, thereby providing a more durable structure with manufacturing economy. The housing, as shown, is formed with an open under-side, through which the bearing member is inserted and is formed with its side walls upwardly and inwardly inclined and the outer or side surfaces of the bearing member are of similar or complemental inclination. Upon the upper portion of the housing member, there are provided at the opposite sides, inwardly and horizontally extending shoulder flanges 13 positioned to overlie the trunnions 11 and to function as a retaining means for the roller bearing 8. The retaining flanges 13, in their longitudinal contour, are desirably, as shown, inclined from the central or intermediate point toward the ends where they are curved, generally concentric to the curvature of the trunnion bearing surfaces 10. The retaining shoulders are accordingly and when the device is used in its inverted position, as indicated in Figure 4, adapted to function similar to the guide surfaces 9 in returning the roller bearing to normal central position when relieved of contact with the cooperating bolster.

As a result of the improved structural arrangement of the parts referred to, including the provision of the overlying retaining shoulder 13 and the separable bearing cradle 6, important advantages are obtained in connection with the assembling of the device. It will be noted that the assembling of the parts is effected by inserting the roller bearing element 8 and the cradle 6 through the opening at the under-side or securing flange side of the housing and that, upon the subsequent securing of the housing to the truck or body bolster, the respective parts are securely retained in proper cooperating relation. The roller bearing in the assembled structure is confined between the cradle bearing member and the retaining flange of the housing and the relative dimensions of the respective parts are such as to prohibit displacement of the roller bearing from its properly operating position. The improved structure, therefore, provides for the retaining of the cradle bearing and roller members in their operating relation on the mere assembling of the structure, thereby eliminating the necessity of special or additional securing means being provided therefor.

Figure 2:
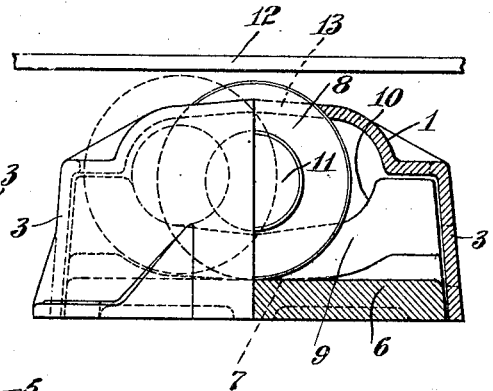
Fig. 2 is a view thereof in side elevation and in vertical longitudinal section of the parts assembled in position for use when mounted upon a truck bolster.
Figure 3:
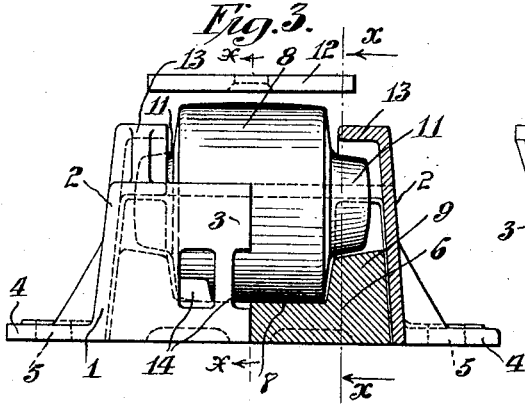
Fig. 3 is a view thereof partially in end elevation with part shown in vertical cross-section.

A further important advantage incidental to the improved structure disclosed, is that the device is adapted to be mounted either upon the truck or upon the body bolster as may be preferred. In Figures 1, 2 and 3, the device is illustrated in the position of use when mounted upon a truck bolster and in Figure 4, the device is shown in inverted position, assumed when the parts are mounted upon a body bolster. In the latter use, the retaining flange 13 of the housing, as will be understood, is instrumental in retaining the roller bearing in its operating position.

A further valuable feature embodied in the structure, as disclosed, consists in forming the central portion of the roller bearing or runway 7 as a horizontal surface throughout its length and for the full length of the bearing cradle and in the association therewith of openings 14, formed in the end walls of the housing. The depressed surface of the lower runway and the openings 14 in cooperating registration therewith provide for a self cleaning action, allowing the escape of foreign particles that may accumulate within the bearing.

The improved anti-friction bearing device of the present invention is as described of few parts and of design wherein the major stresses are imposed upon the bearing cradle member which is of a form which allows of its being made as a drop forging of high carbon steel to possess great strength and wear resisting qualities. The housing member, by reason of its being arranged to function primarily as a securing and attaching means may, with economy, be made of malleable iron or of cast steel as may be desired.

As will be appreciated, the several features of the present invention and the approved embodiment thereof, is subject to varied modification without departing from the scope of the invention as defined in the appended claims. It is, accordingly, intended that the present disclosure shall be interpreted as illustrative and not in a limiting sense.

Having described our invention, we claim:

1. A side bearing for railway cars comprising a trunnioned roller element, a housing member adapted to be secured to a car or truck bolster and formed at one side with an opening through which the roller protrudes and at its opposite or base portion with an enlarged opening, a separable bearing member fitted within the enlarged opening and formed to provide bearing surfaces for both the roller periphery and for the trunnions, said housing having retaining flanges overlying the roller trunnions in opposed relation to the side walls of the bearing member whereby the roller element will be retained in its operating position upon the assembling of the parts, said retaining flanges being oppositely inclined from their ends toward the center to effect centering of the roller when used in inverted position.

2. A side bearing for railway cars comprising a trunnioned roller element, a housing member having a base portion adapted for attachment to a car or truck bolster and an opening at the opposite side through which the roller protrudes, a separable cradle insert fitted within the housing and integrally formed with a central bearing surface or runway for the roller periphery extending longitudinally thereof, longitudinally extending guide shoulders at the opposite sides of the runway formed with their upper surfaces inclined upwardly from the central position and terminating in curved bearing surfaces at the opposite ends of the cradle member adapted to be engaged by the roller trunnions and to transfer the load thereto at the respective ends of the roller travel, said housing being formed with retaining flanges positioned to overlie the roller trunnions and having inner bearing surfaces of opposed inclination to the guide shoulders and operative to retain the roller element in operating position upon the assembling of the parts.

3. A side bearing for railway cars comprising a trunnioned roller element, a housing member having a base portion adapted for attachment to a car or truck bolster and an opening at the opposite side through which the roller protrudes, a separable cradle insert fitted within the housing and integrally formed with a central bearing surface or runway for the roller periphery extending longitudinally thereof, longitudinally extending guide shoulders at the opposite sides of the runway formed with their upper surfaces inclined upwardly from the central position and terminating in curved bearing surfaces at the opposite ends of the cradle member adapted to be engaged by the roller trunnions to transfer the load thereto at the respective ends of the roller travel, said housing being formed with retaining flanges positioned to overlie the roller trunnions in opposed relation to the cradle guide shoulders for retaining the roller in operating position, said retaining flanges having their inner surfaces inclined longitudinally from their end surfaces to a central point whereby in the position of use when mounted upon a car bolster the inclines will function to return the roller to central position.

Signed at Oregon, county of Ogle and State of Illinois this 4th day of November A. D. 1924.

ELMYR A. LAUGHLIN.

Signed at New Rochelle, county of Westchester and State of New York this 1st day of November A. D. 1924.

EBEN RAY PACKER.